United States Patent [19]

Ito

[11] Patent Number: 5,033,832
[45] Date of Patent: Jul. 23, 1991

[54] HIGH ZOOM-RATIO LENS SYSTEM FOR COVERING WIDE ANGLE FOR COMPACT CAMERA

[75] Inventor: Takayuki Ito, Tokyo, Japan

[73] Assignee: Asahi Kogaku Kogyo K.K., Tokyo, Japan

[21] Appl. No.: 515,964

[22] Filed: Apr. 27, 1990

[30] Foreign Application Priority Data

Apr. 28, 1989 [JP] Japan ................................. 1-110849
Feb. 8, 1990 [JP] Japan ................................. 2-29210

[51] Int. Cl.$^5$ ............................................. G02B 15/14
[52] U.S. Cl. ................................. 350/427; 350/423
[58] Field of Search ................ 350/423, 426, 427, 432

[56] References Cited

U.S. PATENT DOCUMENTS 4,773,744  9/1988  Yamanashi ........................ 350/427
4,840,467  6/1989  Takada et al. ..................... 350/427
4,978,204  12/1990  Ito ...................................... 350/427

FOREIGN PATENT DOCUMENTS 60-57814   4/1985  Japan .
62-78522   4/1987  Japan .
63-43115   2/1988  Japan .
63-153511  6/1988  Japan .
63-153513  6/1988  Japan .
63-157120  6/1988  Japan .
63-159818  7/1988  Japan .
63-161423  7/1988  Japan .
2224131    4/1990  United Kingdom .

Primary Examiner—Bruce Y. Arnold
Assistant Examiner—James Phan
Attorney, Agent, or Firm—Sughrue, Mion, Zinn, Macpeak & Seas

[57] ABSTRACT

A high zoom-ratio lens system covering wide angle for compact camera comprising a first lens group having a positive focal length, a second lens group having a positive focal length, and a third lens group having a negative focal length, disposed in order from the object side. When zoomed from a short focal length side to a long focal length side, all of the first lens group, the second lens group, and the third lens group being moved toward the object so that a distance between the first lens group and the second lens group increases and the distance between the second lens group and the third lens group decreases. The second lens group further comprises, in the order from the object side, a lens group IIa having a negative focal length and a lens group IIb having a positive focal length. When zoomed from the short focal length side to the long focal length, a stop diaphragm is moved along with the second lens group. The specific conditions are satisfied.

17 Claims, 11 Drawing Sheets

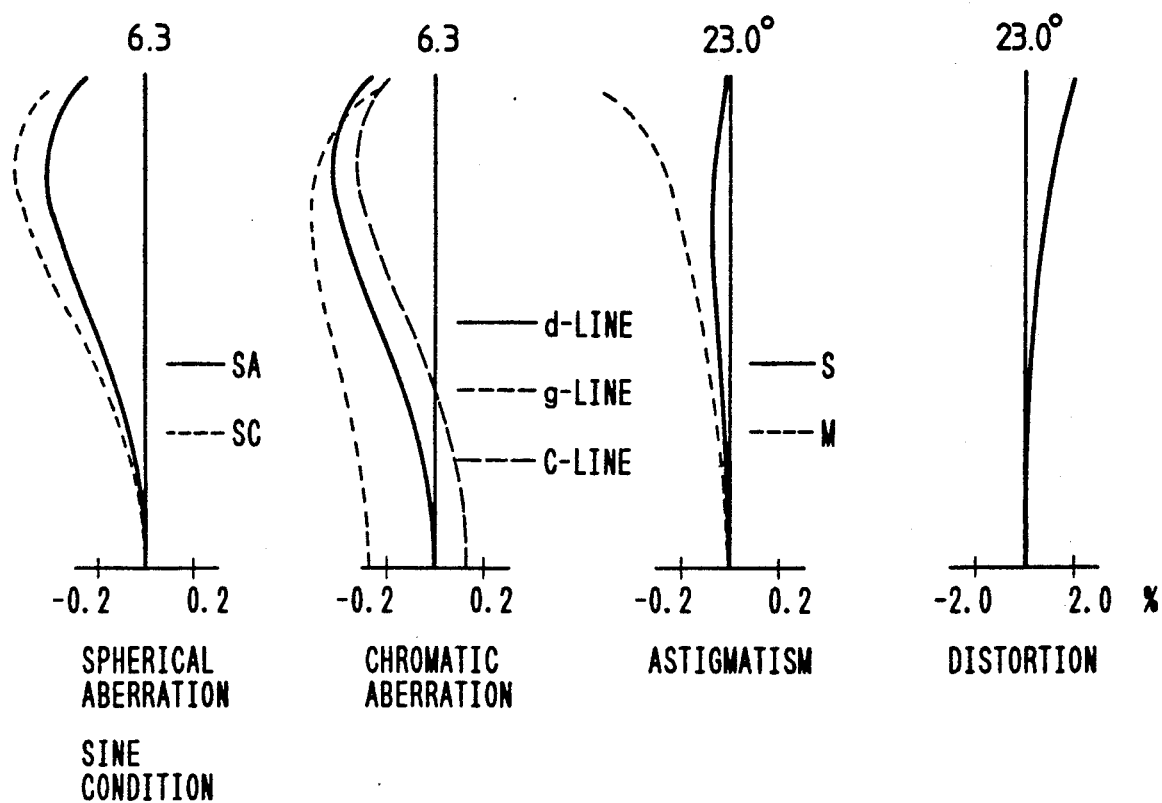
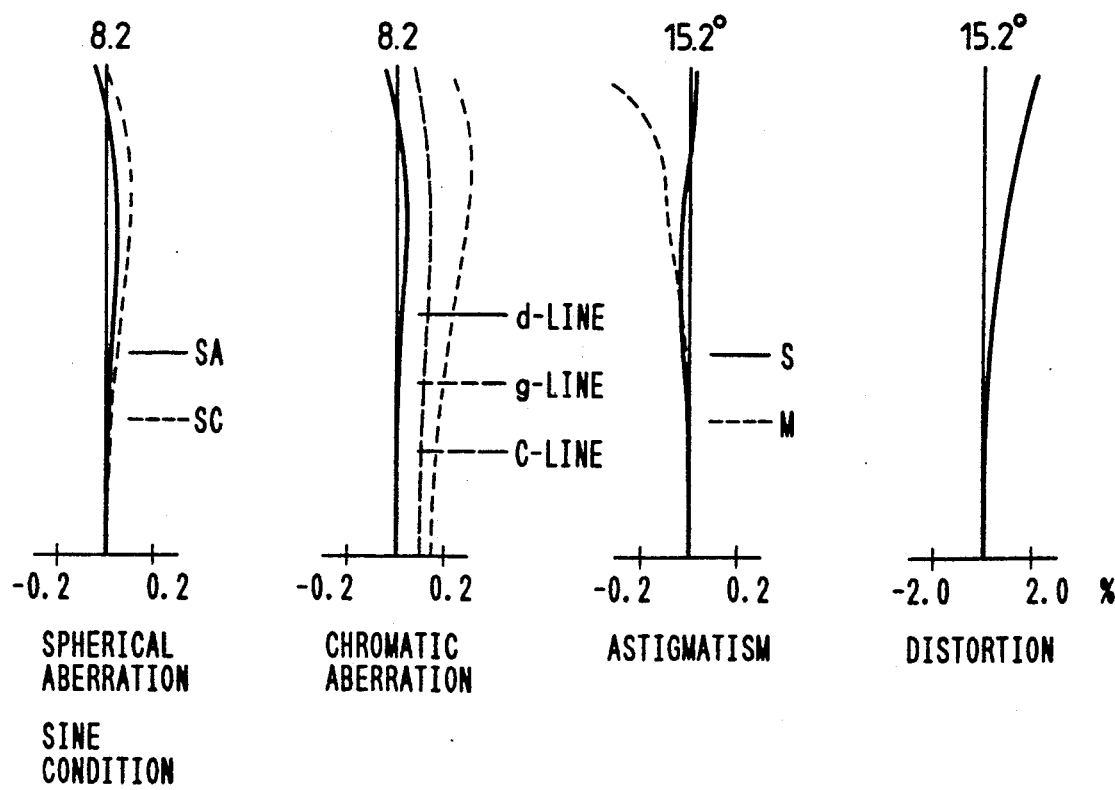

HIGH ZOOM-RATIO LENS SYSTEM FOR COVERING WIDE ANGLE FOR COMPACT CAMERA

BACKGROUND OF THE INVENTION

The present invention relates to a zoom lens suitable for a compact camera which is subject to a small backfocus, particularly relates to a zoom lens for a compact camera with half an angle of view of approximately 37° and with a high zoom ratio of 2.5 or more.

A variety of zoom lenses for compact cameras have been known heretofore. The zoom lenses consisting, of three groups or more with a zoom-ratio exceeding two times are categorized as follows:

(i) Four-lens group zoom lens system comprising, in order from the object side a positive lens group I, a negative lens group II, a stop diaphragm, a positive lens group III, and a negative lens group IV, all the lens groups being moved independent of each other toward the object- (this type includes a zoom lens where some of the four lens groups are moved in unison with each other). For example, such a zoom lens system is disclosed in Japanese patent laid-open publications No. SHO 63-43115, NO. SHO 63-159818, and No. SHO 63-157120.

(ii) Three-lens group zoom lens system comprising a positive lens group I, a negative lens group II (which has a negative lens group IIa disposed toward the object, a positive lens group IIb disposed toward the image, and a stop diaphragm therebetween and which may be equivalent to the lens group II and the lens group III of the four-lens group zoom system) and a negative lens group II (which s equivalent to the lens group IV of the above-described four-lens group zoom system), all the lens groups being moved independently of each other toward the object. For example, the zoom lens system are disclosed in Japanese patent laid-open publications No. SHO 63-15313 and NO. SHO 63-161423.

A four-lens group zoom system and a three-lens group zoom system whose zoom ratio is less than 2 (approximately, 1.5 to 1.6) are disclosed in Japanese patent laid-open publications Nos. SHO 60-57814 and SHO 62-78522, respectively. The arrangement of lens groups and a stop diaphragm of these two systems are the same as those in the system (i) and (ii).

(iii) Three-lens group zoom type lens comprising, in order from the object, a positive lens group I, a positive lens group II (which is the same as the system (ii) except that no stop diaphragm is used therein), a stop diaphragm after the group II negative lens group III disposed, all the lens groups being moved toward the object. For example, the zoom lens system was invented by the present inventor and (U.S. patent application Ser. No. 404,399 filed on Sept. 7, 1989, now U.S. Pat. No. 4,978,204).

(iv) Substantially four-lens group zoom system wherein the lens groups IIa and IIb are moved independently of each other in the system (iii). For example, the zoom lens is disclosed also in the foregoing U.S. afflication.

However, in the system (i), all the four lens groups should be moved independently of each other. Thus, a member of cams should be used in a restricted small space, resulting in complication in mechanism.

In the systems (i) and (ii), although the stop diaphragm is disposed between the lens group IIa and the lens group IIb (in the case of the four-lens group system, the stop diaphragm is disposed between the lens group II and the lens group III), since a shutter mechanism should be disposed between the two lens groups, which is likely to lead to production errors, the arrangement would become complicated so that it is difficult to ensure a high mechanical accuracy with case. In addition, since the optical sensitivity is high, it would be difficult to stabilize the optical performance. Moreover, this system could not make the camera compact.

To solve the above noted problems, there is provided a system as proposed in the foregoing U.S. application.

In the systems (i), (ii), (iii), and (iv), half the angle view on the short focal length side is approximately 30°. Thus, the focal length on the telephoto side is mainly improved to ensure a desired telephoto effect. On the other hand, it is also necessary to improve the performance on the wide-angle side or talking scenic pictures. The users require wide angle, high zoom-ratio compact cameras rather than those whose half angle of view on the short focal length side is approximately 30°. However, the cameras which satisfy these demands have not been provide heretofore.

In other words, the foregoing systems relate to telephoto type zoom lenses due to the short backfocus over the entire zoom range. In addition, since a wide angle, high zoom ratio zoom lens covering half the angle of view of approximately 37° was not known. Thus, it is difficult to accomplish a wide angle ability and a high zoom ratio at the same time for telephoto type compact system.

SUMMARY OF THE INVENTION

According, an object of the present invention is to provide, by modifying a lens group I of the prior system, a zoom lens for a compact camera providing a wide angle ability, a high zoom ratio, and a physical compactness.

A high zoom-ratio lens covering wide angle for compact camera according to the present invention.

An other object of the present invention is to modify the prior system by applying an spherical surface in the lens group IIb.

According to the present invention, in a high zoom-ratio lens system covering wide angle for compact camera comprising a first lens group having a positive focal length, a second lens group having a positive focal length, and a third lens group having a negative focal length (or wide angle side), disposed in order from the object side, when zoomed from a short focal length side to a long focal length side (or telephoto side), all of the first lens group, the second lens group, and the third lens group being moved toward the object so that a distance between the first lens group and the second lens group increases and the distance between the second lens group and the third lens group decrease;

(A) the second lens group further comprises, in the order from the object side, a lens group IIa having a negative focal length and a lens group IIb having a positive focal length;

(B) when zoomed from the short focal length side to the long focal length, a stop diaphragm is moved along with the second lens group;

(C) the following conditions (2) and (3) are satisfied:

$$1.09 < h_{IMAX}/h_{I-1} < 1.4 \tag{2}$$

$$0.5 < f_T/f_I < 1.5 \tag{3}$$

where
- $h_{IMAX}$: the maximum value of the height of the paraxial rays in the first lens group;
- $h_{I1}$: the height of the paraxial on-axis rays on a first surface of a first lens group;
- $f_T$: the focal length of the entire system at the long focal length;
- $f_I$: the focal length of the first lens group.

The first lens group having the positive focal length further comprises a first lens element which is a biconcave negative lens, a second lens element which is a biconvex positive lens, and a third lens element which is a positive lens whose convex side surface faces the object, the following conditions being satisfied:

$$0.95 < X_I/X_m < 1.3 \qquad (4)$$

$$2.0 < f_I/|f_I| < 5.0 \qquad (5)$$

$$0 < f_W/|r_1| < 0.7 \qquad (6)$$

$$0 < D_2/f_w < 0.25 \qquad (7)$$

where
- $X_I$: the amount of zooming movement of the first lens group;
- $X_{III}$: the amount of zooming movement of the third lens group;
- $f_1$: the focal length of the first lens element;
- $f_W$: the focal length of the entire system at the short focal length;
- $f_1$: the curvature radius of the surface, facing the object, of the first lens element ($r_1 < 0$);
- $d_2$: the distance between the first lens element and the second lens element.

The lens group IIa having the negative focal length further comprises a negative cemented lens consisting of a fourth lens element which is a biconcave negative lens having a cemented inter face with a large convex curvature facing the object and a fifth lens element which is a positive lens, and a sixth lens element which is a negative meniscus lens whose concave surface faces the object, the following conditions being satisfied, $$0.0 < f_{IIa}/f_6 < 0.5 \qquad (8)$$

$$-1.5 < f_W/r_{10} < -0.5 \qquad (9)$$

where
- $f_{IIa}$: the focal length of the lens group IIa;
- $f_6$: the focal length of the sixth lens element;
- $r_{10}$: the curvature radius of the sixth lens element facing the object.

The lens group IIb having the positive focal length further comprises a positive cemented lens consisting of a seventh lens element which is a positive lens with a large curvature concave cemented interface facing the object and an eighth lens element which is a negative meniscus lens, and a ninth lens element which is a positive lens, disposed in order from the object side.

The third lens group having the negative focal length further comprises a tenth lens element which is a positive lens having a large convex curvature surface facing the image and eleventh and twelfth lens elements and which are negative lenses each of which has a large concave curvature surface facing the object, disposed in order from the object side.

The stop diaphragm is disposed behind the second lens group and between the second lens group and the third lens group the stop diaphragm being moved together with the second lens group.

When zoomed from the short focal length to the long focal length, the first lens group, the stop diaphragm, and the third lens group are fixed and only the second lens group is moved toward the object.

When zoomed from the short focal length to the long focal length, the first lens group, the second lens group, and the stop diaphragm are fixed and only the third lens group is moved toward the image.

According to another aspect of the invention, in a high zoom-ratio lens system covering wide angle for compact camera comprising a first lens group having a positive focal length, a second lens group having a positive focal length, and a third lens group having a negative focal length, disposed in order from the object side, when zoomed from a short focal length side to a long focal length side, all of the first lens group, the second lens group, and a third lens group being moved toward the object side so that the distance between the first group and the second group increases and a distance between the second lens group and the third lens group decreases;

(A) the second lens group further comprises, disposed in the order from the object side, a lens group IIa having a negative focal length and a lens group IIb having a positive focal length;

(B) when zoomed from the short focal length side to the long focal length, a stop diaphragm is moved together with the second lens group;

(C) the lens group IIb has an aspherical surface with divergence against a paraxial curvature radius which satisfies the following equation (1):

$$-50 < \Delta I_{2b} < -5 \qquad (1)$$

where
- $\Delta I_{2b}$ is the amount of variation of the third order aspherical surface aberration coefficient on the aspherical surface of the lens group IIb (the aberration coefficient when the focal length of the entire system at the short focal length is regarded as 1).

The stop diaphragm is disposed in the second lens group or between the second lens group and the third lens group, the stop diaphragm being moved together with the second lens group, when focused.

The stop diaphragm is disposed between the second lens group and the third lens group, the first lens group, the stop diaphragm, and the third lens group being fixed, only the second lens group being moved toward the object, when focused.

The stop diaphragm is disposed between the second lens group and the third lens group, the first lens group, the second lens group, and the stop diaphragm being fixed, only the third lens group being moved toward the object, when focused.

DETAILED DESCRIPTION OF THE INVENTION

Figure 1:
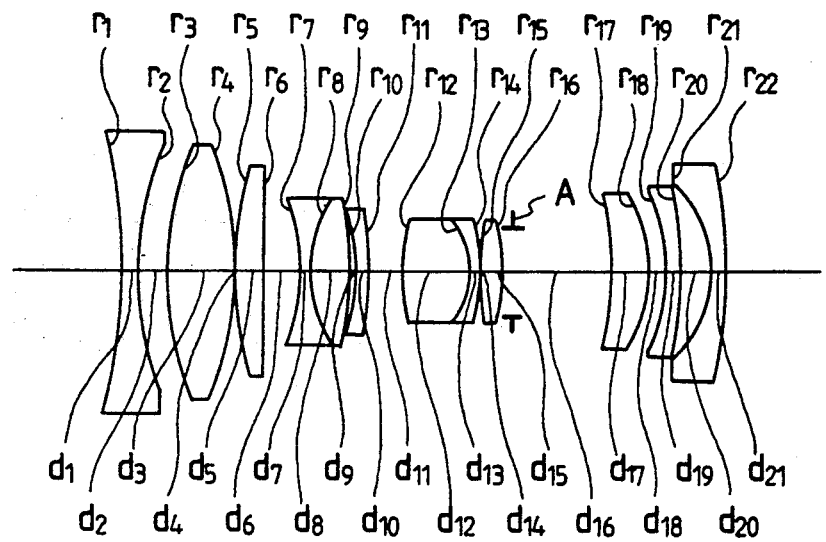
FIGS. 1, 3, 5, 7 and 9 are lens system structural diagrams on the short focal length side of examples 1 to 5 of the present invention, respectively.
Figure 2A:
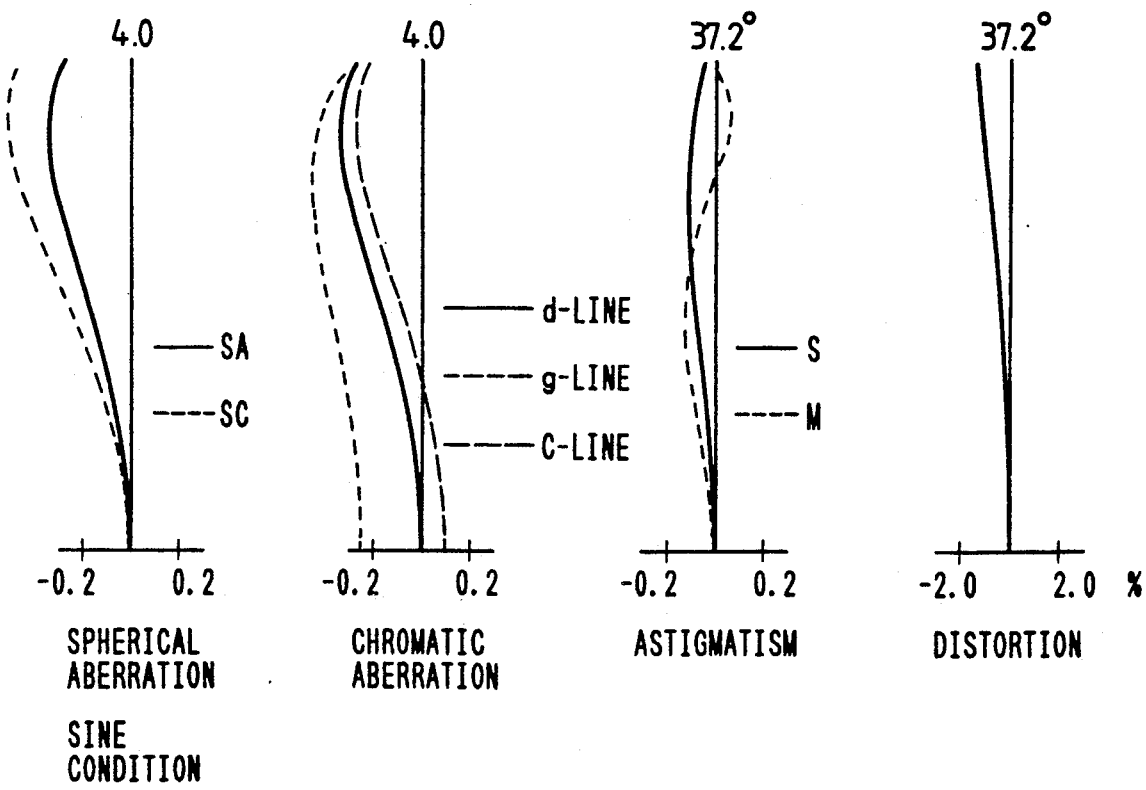
FIGS. 2, 4, 6, 8 and 10 are diagrams showing various types of aberrations of examples 1 to 5 of the present invention where (a), (b), and (c) represent the short focal length side, the middle focal length side, and the long focal length side, respectively.
Figure 3:
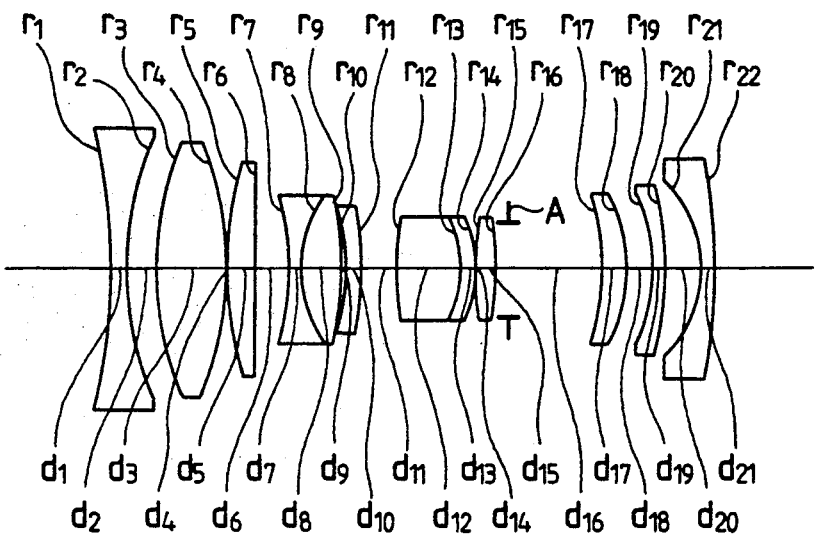
Figure 4A:
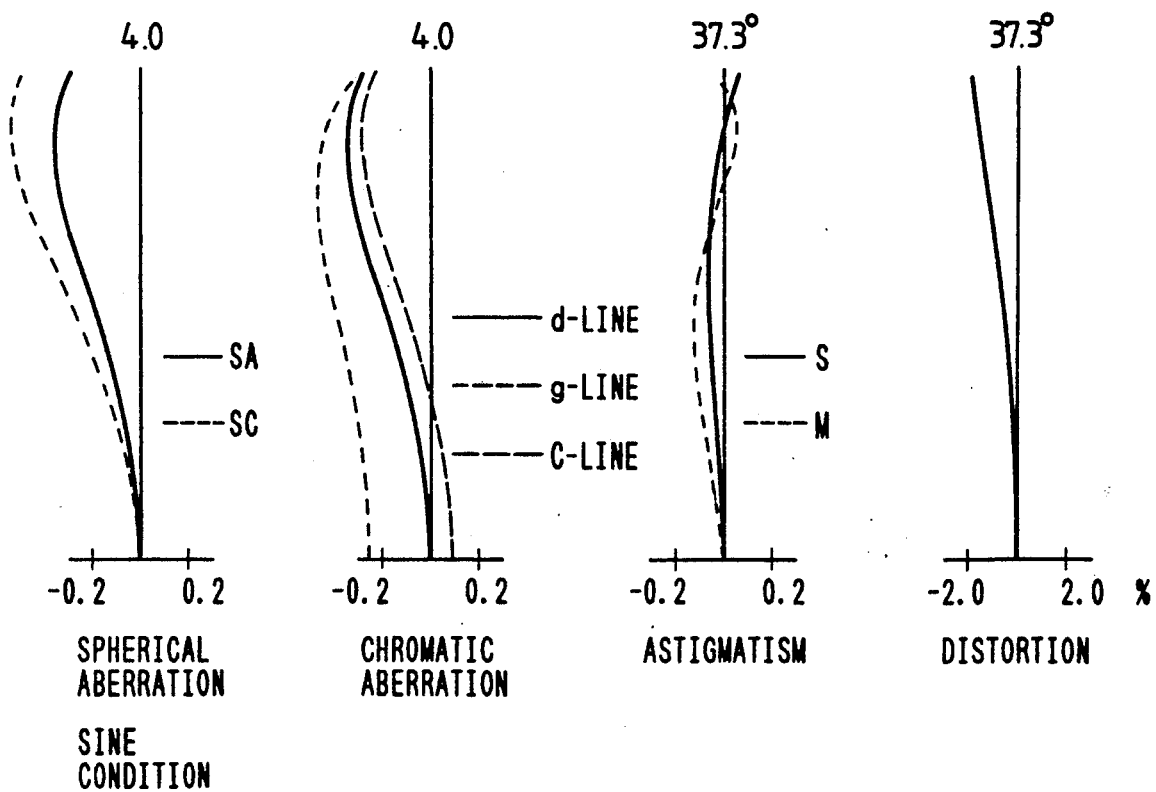
Figure 4B:
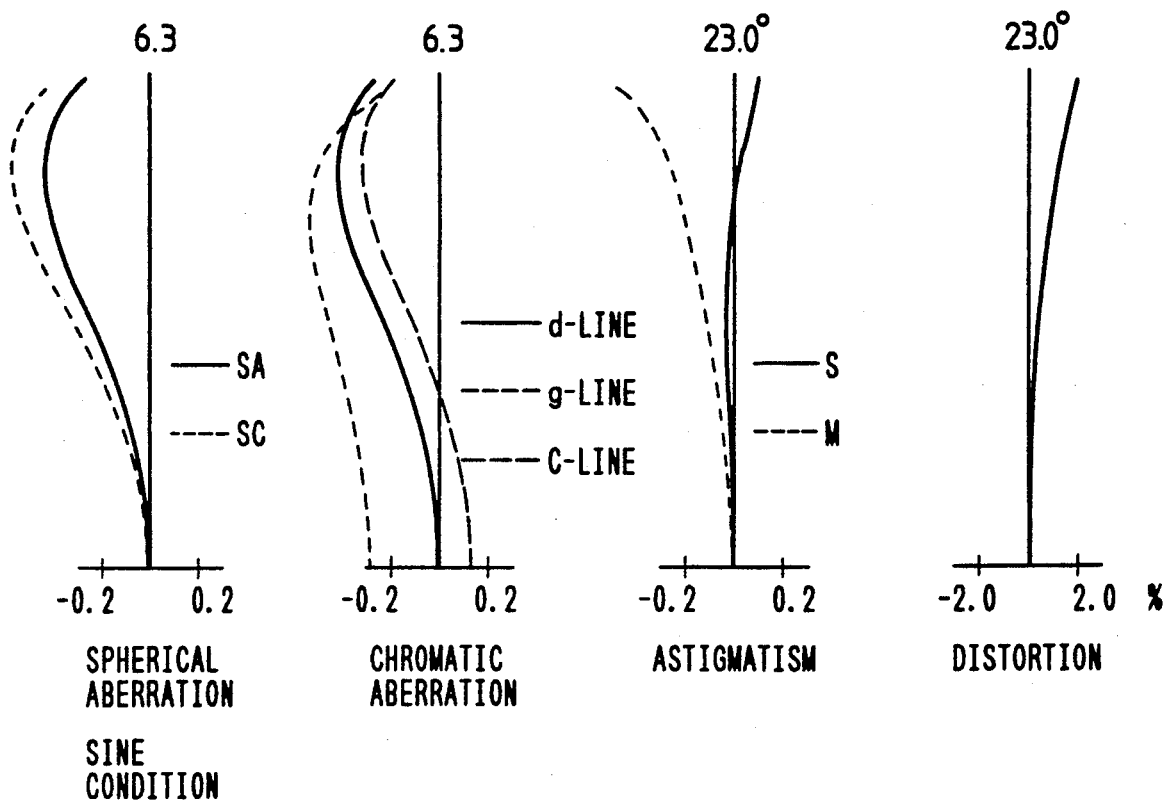
Figure 4C:
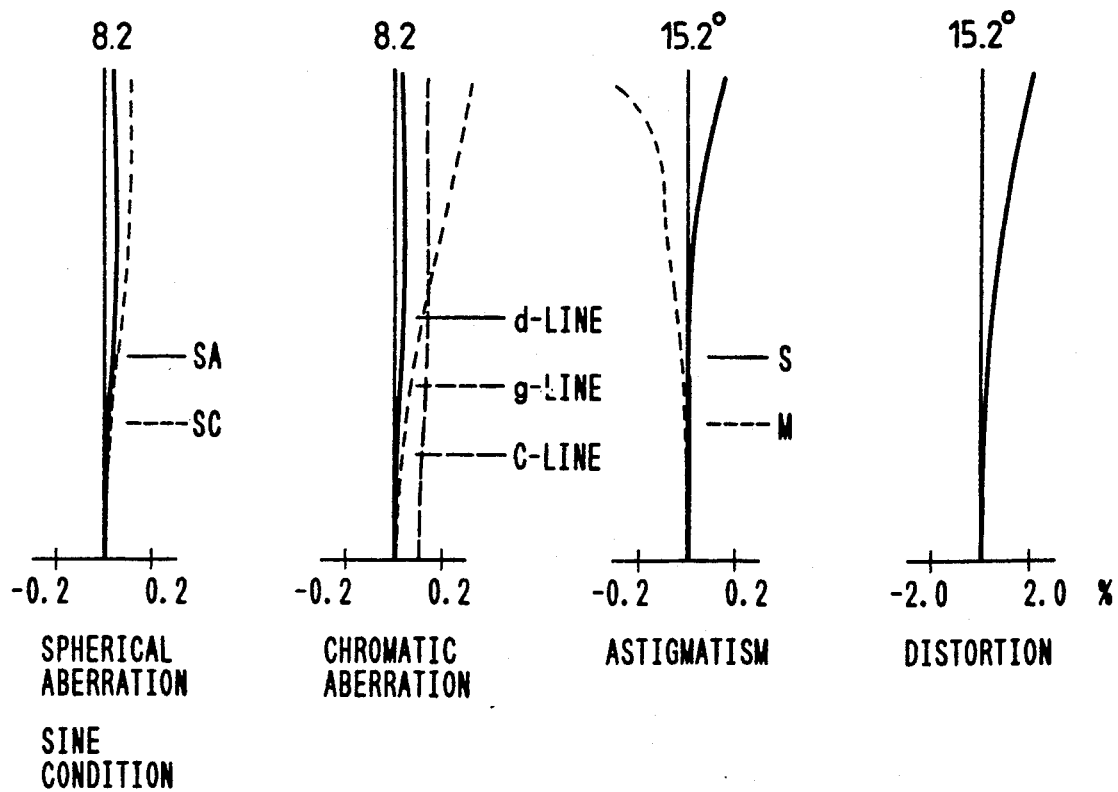
Figure 5:
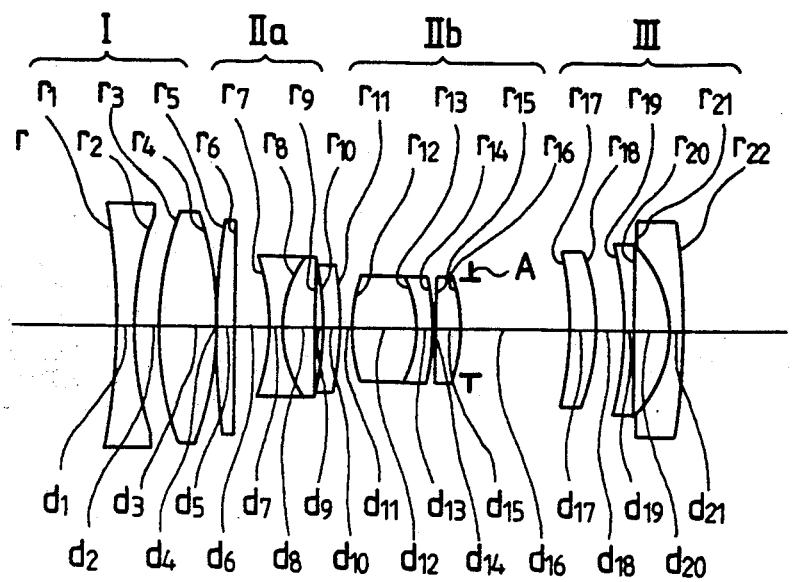
Figure 6A:
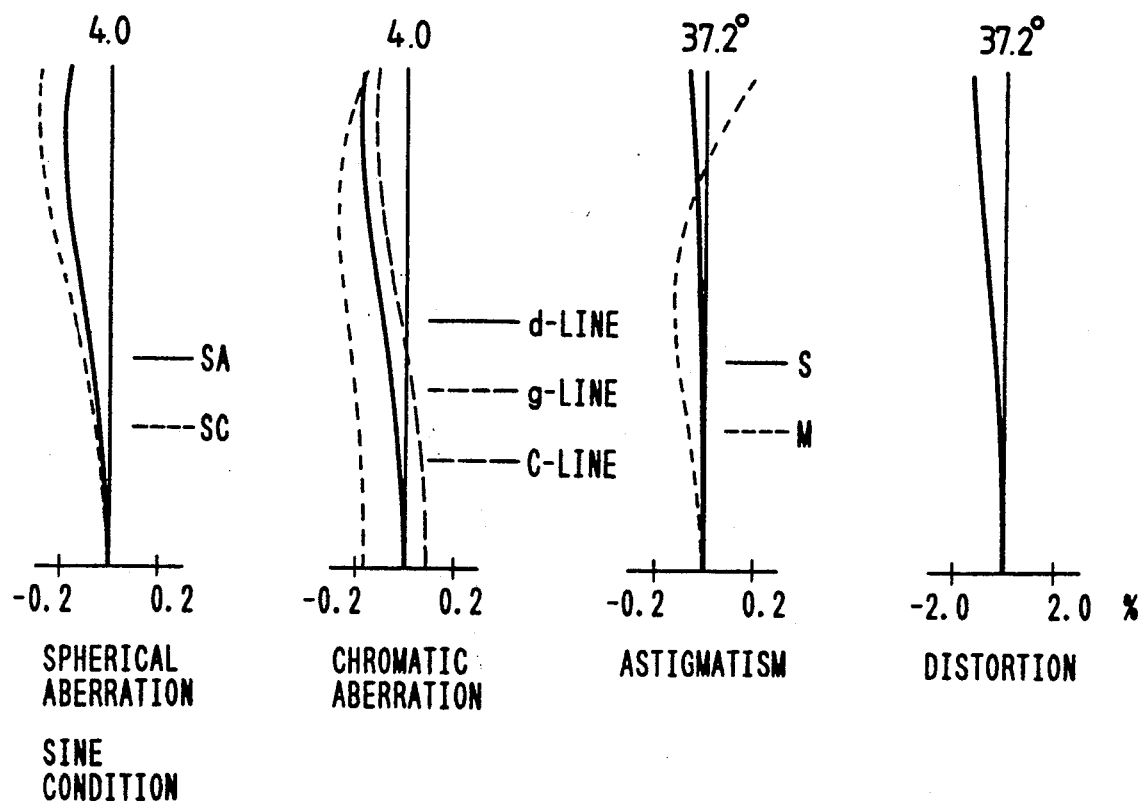
Figure 6B:
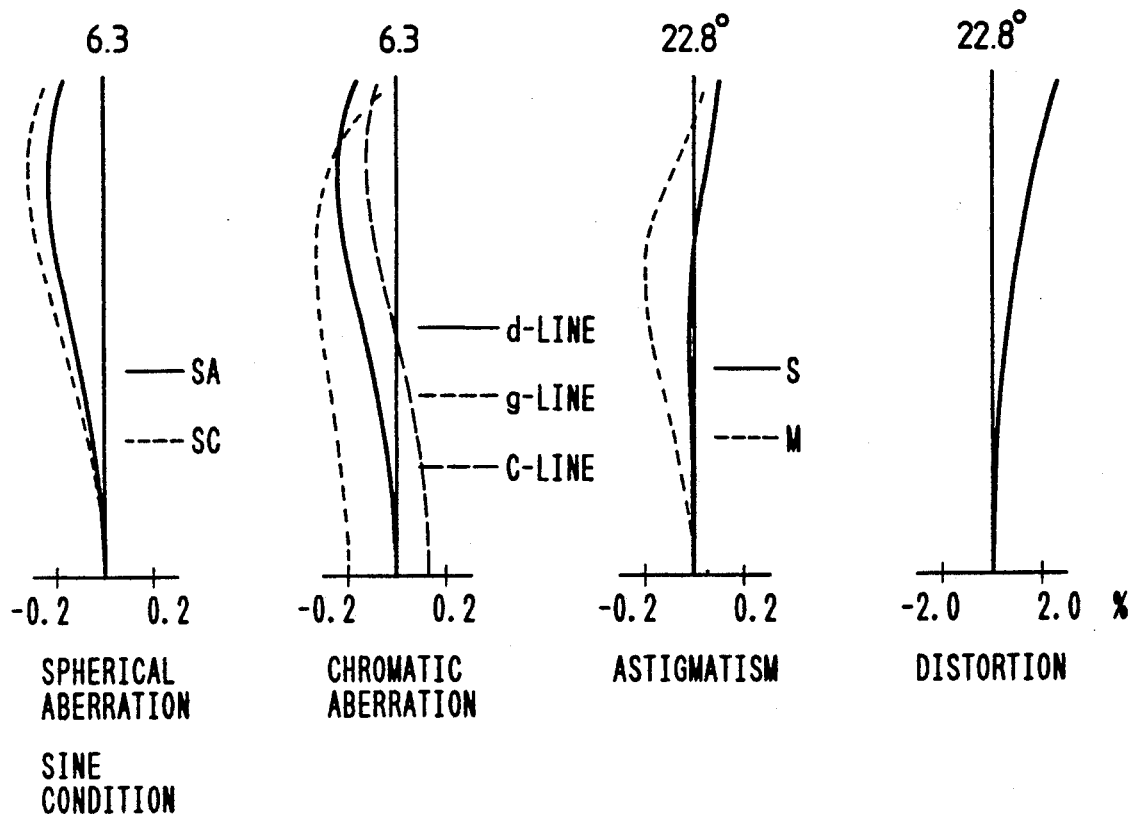
Figure 6C:
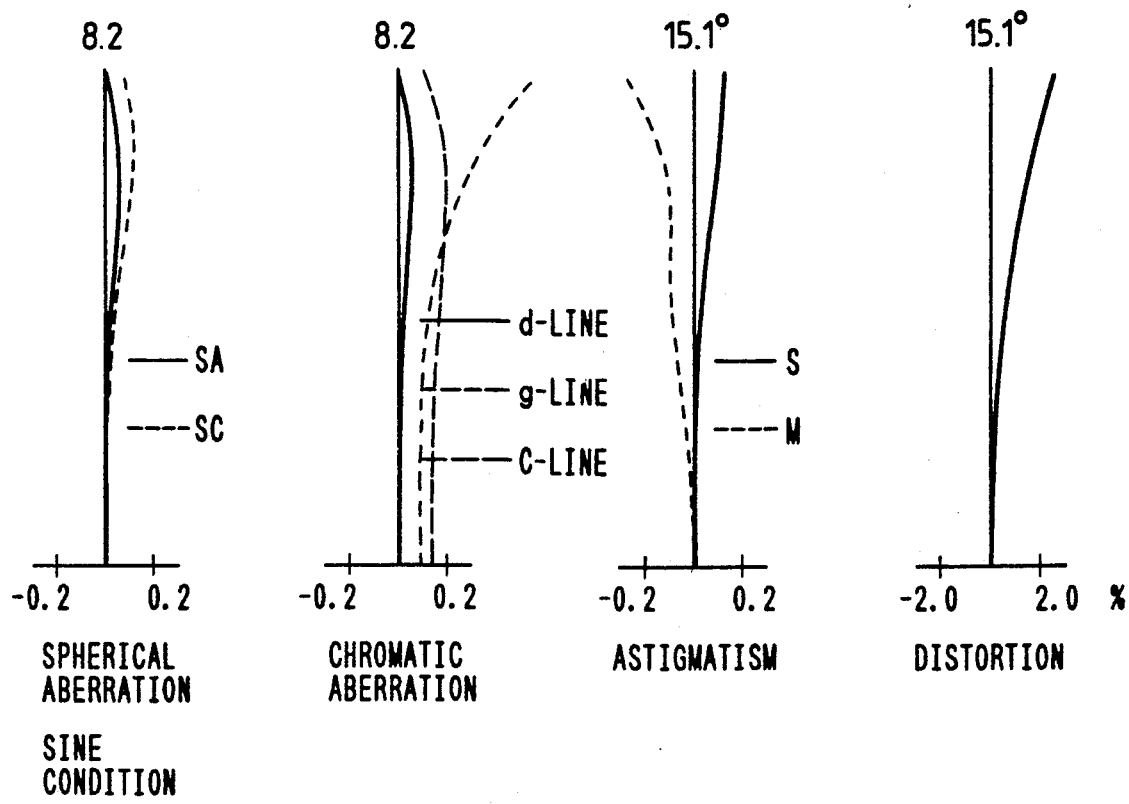
Figure 7:
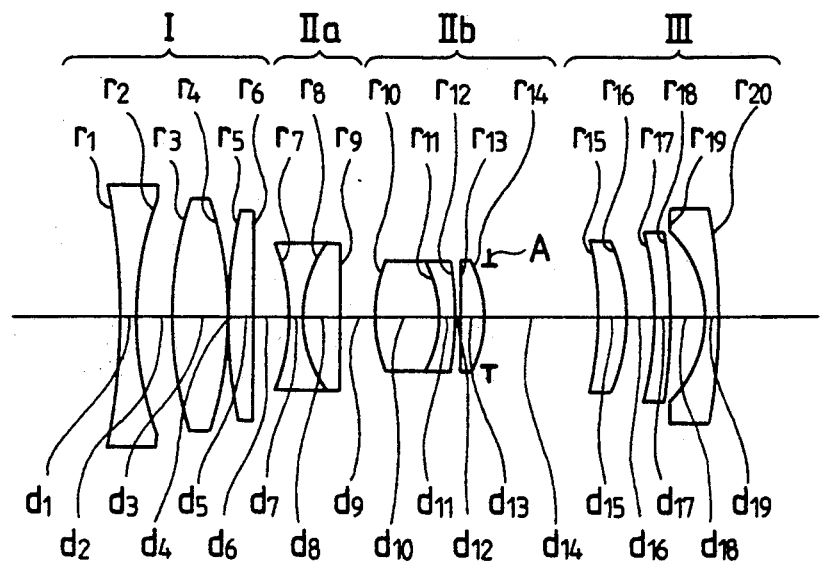
Figure 8A:
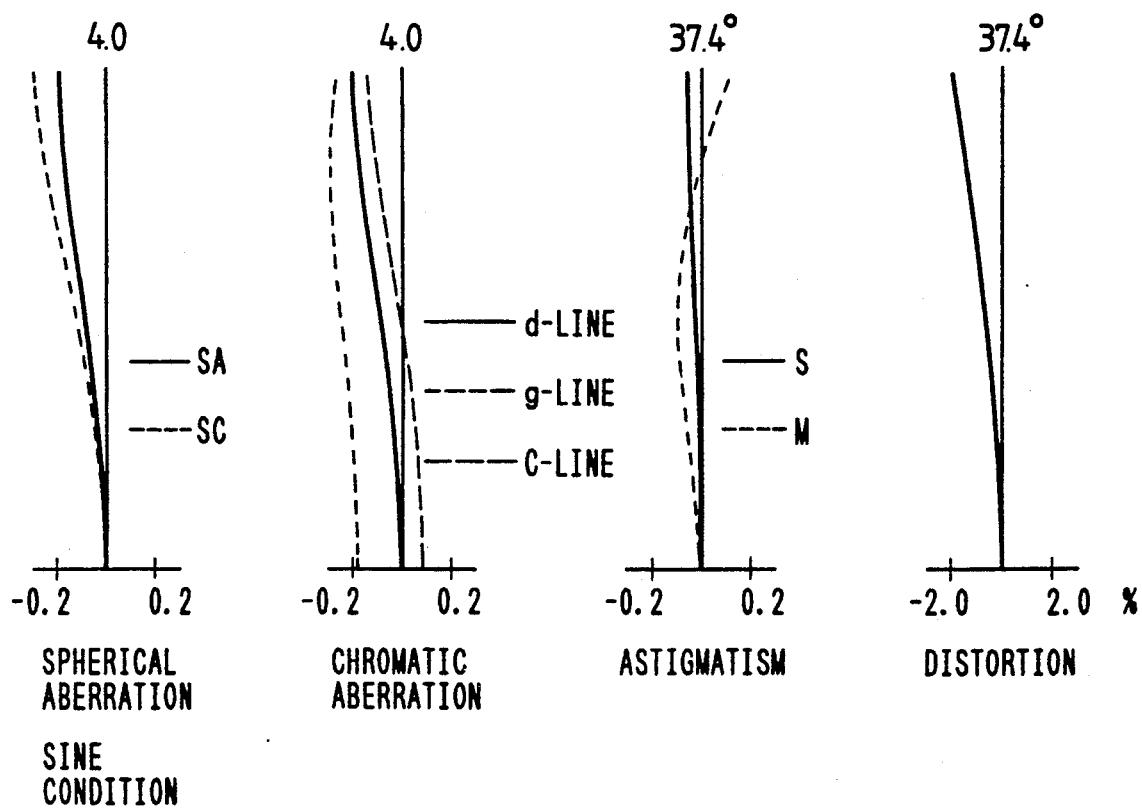
Figure 8B:
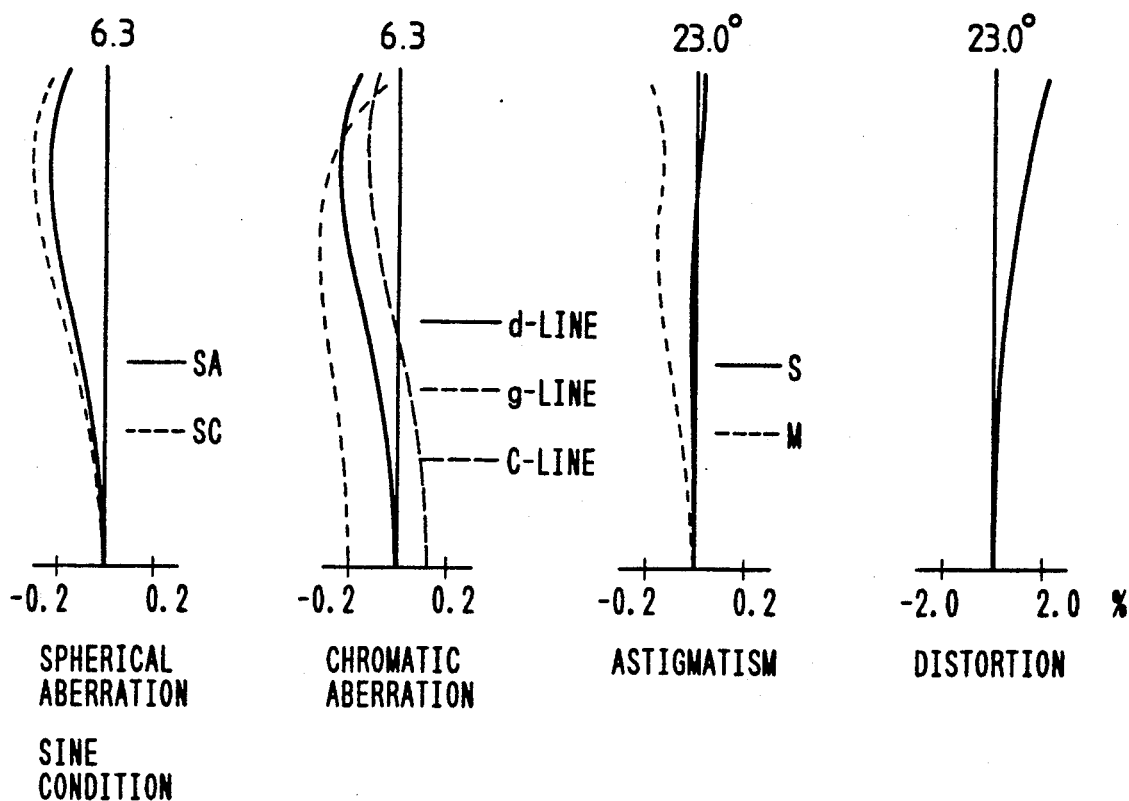
Figure 8C:
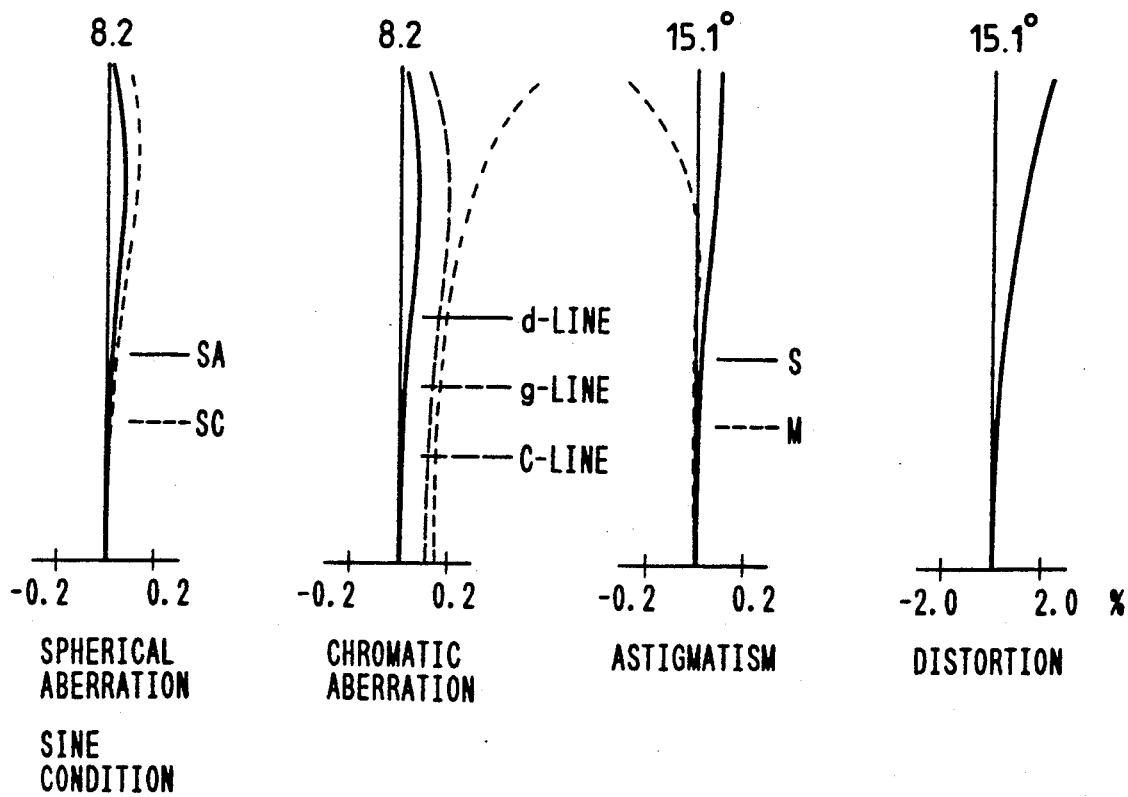
Figure 9:
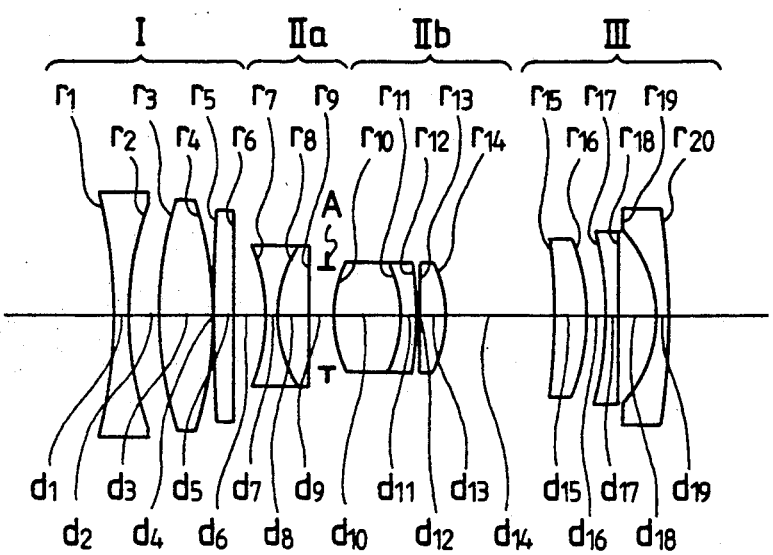
Figure 10A:
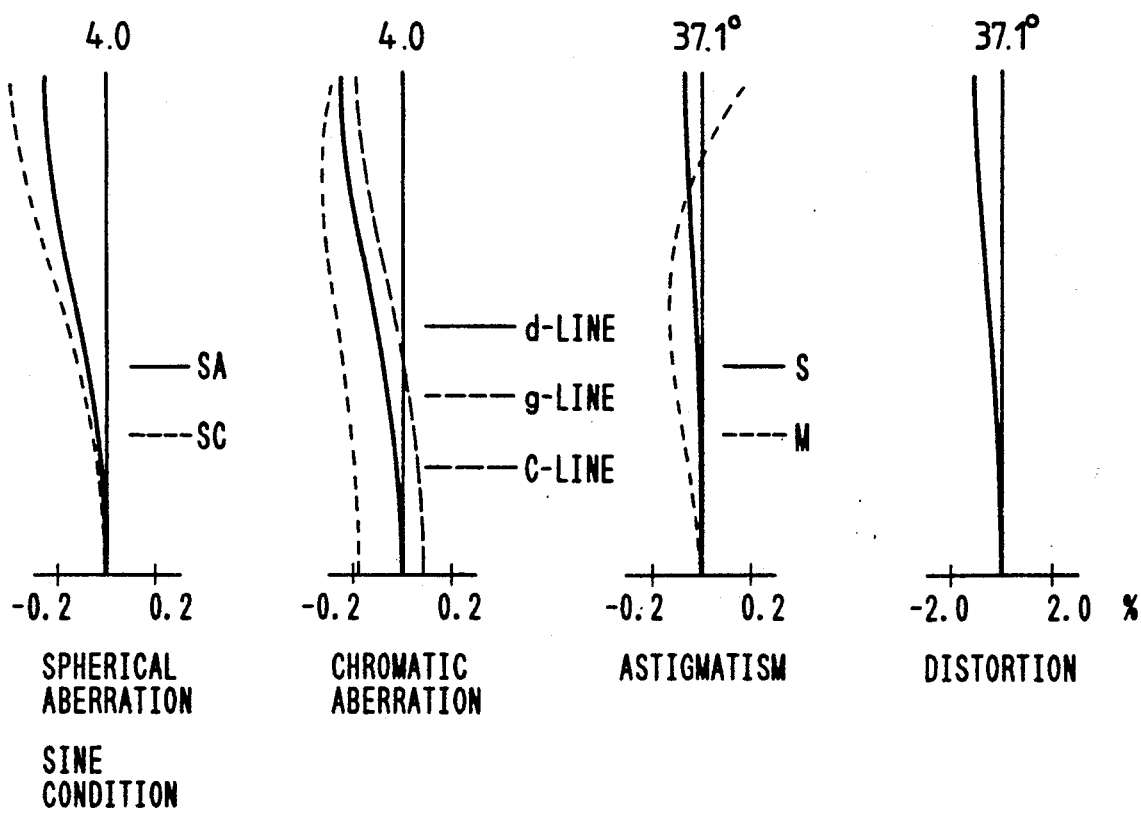
Figure 10B:
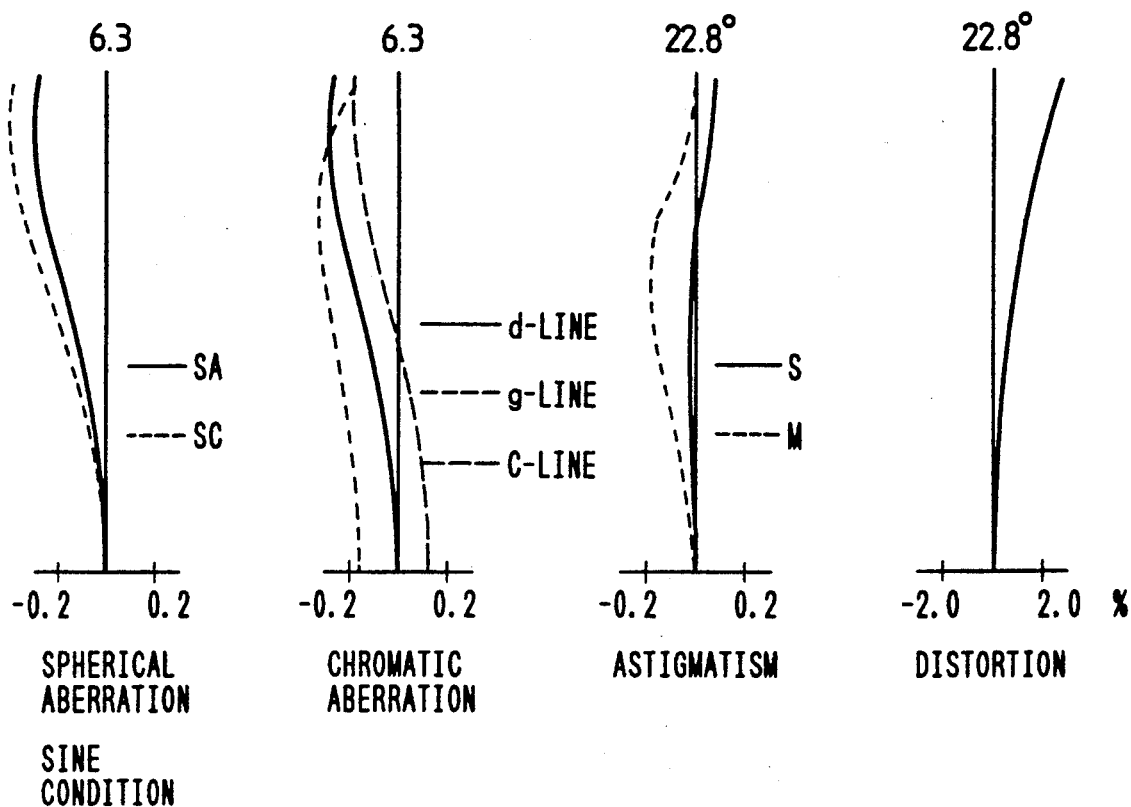
Figure 10C:
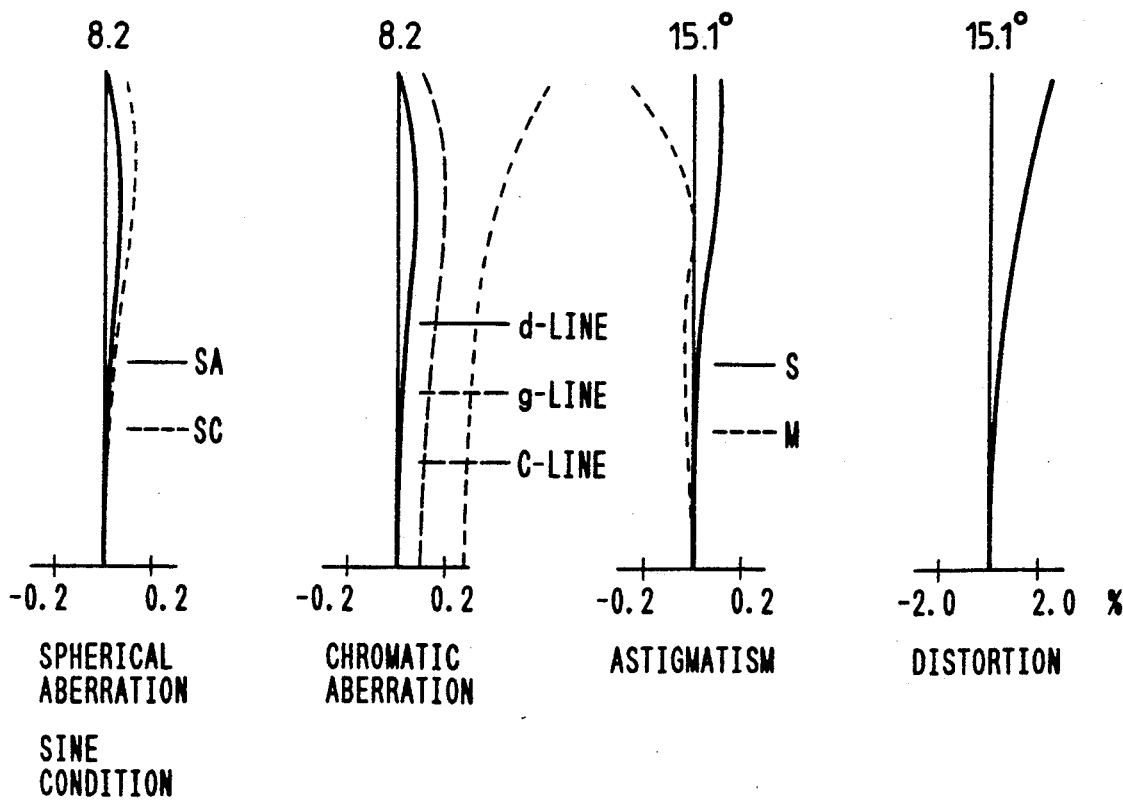
Figure 11:
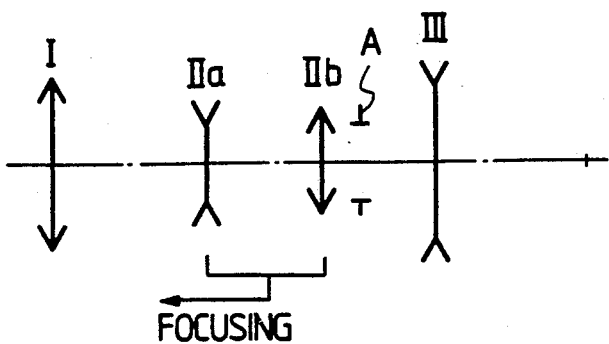
FIGS. 11 to 14 are schematic views illustratry the movement of the lens groups during the focusing operation according to the invention; where, $\nu i$ is the curvature radius of each lens surface; $d_i$ is the lens thickness or lens interval; and A is stop diaphragm.
Figure 12:
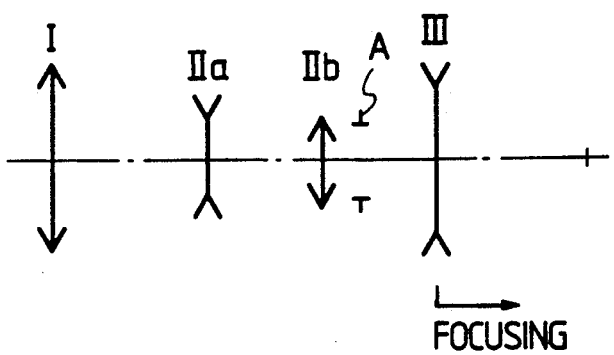
Figure 13:
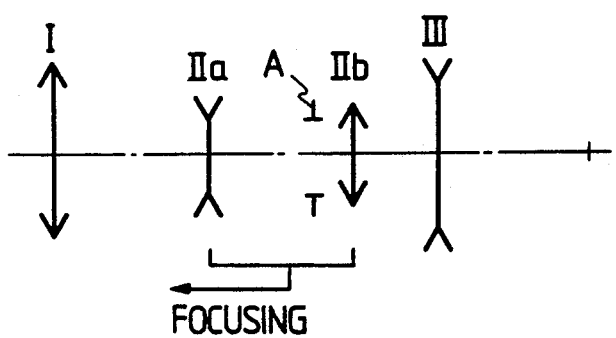
Figure 14:
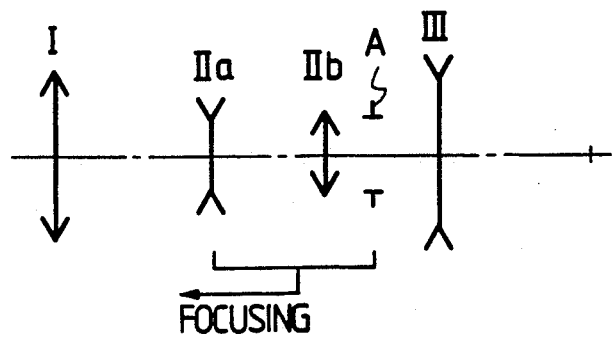

The present invention will now be explained on the basis of the foregoing conditions.

According to the present invention, the three-lens group zoom type (applicable to the four-lens group zoom type) similar to the prior arts is used to accomplish a high zoom-ratio lens for a compact camera. However, to further widen the angle of view, it is preferred to use an aspherical surface in the lens group II.

By providing the aspherical surface in the second lens group, it is possible to reduce the variations of the spherical aberration and coma and the number of lens elements. The best effect can be expected and the aspherical lens can easily be produced when the aspherical surface is provided in the lens group IIb whose lens diameter is small.

When aiming at widening the angle of view, the diameters of the elements of the first lens group 1 tend to increase. However, in the compact camera, when the angle of view becomes large, the diameter of the lens should be decreased due to the barrier condition and the like. Although the interchangeable lenses for SLR cameras have not generally been provided with the barrier function, the aspherical surface is advantageous to protect the user's eye and to compactly structuring the camera body.

It is preferred to have a divergence on the aspheric surface with respect to the paraxial curvature radius (the diameter of the concave surface is proportional to the curvature diameter, whereas that of the convex surface is reversely proportional to the curvature diameter).

By compensating the divergence of the negative lens group IIa using the aspherical surface, it is possible to reduce the diameter of the front lens. The equation (1) relates to the aspherical surface. If the upper limit of the equation (1) is exceeded, the amount of aspherical surface decreases. Thus, the diameter of the front lens cannot be reduced. On the other hand, when the value exceeds the lower limit of the equation (1), the amount of the aspherical surface becomes excessive. Thus, high order aberrations disadvantageously occur and the aspherical surface becomes difficult to produce. By providing the aspherical surface having divergence in the lens group IIb, the function of the negative meniscus lens in the lens group IIa becomes weak. Thus, the omission of this lens does not lead to remarkable deterioration of the performance. Consequently, the aspherical surface contribute to reduce the number of lens elements.

The amount of variation of the third aberration ratio due to the aspherical surface will be described. The shape of the aspherical surface can be generally expressed as follows.

$$x = \frac{cy^2}{1 + \sqrt{1 - c^2 y^2}} + a_4 y^4 + a_6 y^6 + a_8 y^8 + a_{10} y^{10} + \ldots$$

When the focal length f is 1.0, the resultant value is transformed as follows. Namely, substitute the following equations into the above equation.

$$X = \frac{x}{f}, Y = \frac{y}{f},$$

$C = fc$, $A_4 = f^3 a_4$, $A_6 = f^5 a_6$, $A_8 = f^7 a_8$, $A_{10} = f^9 a_{10}$

The following equation is obtained.

$$X = \frac{CY^2}{1 + \sqrt{1 - C^2 Y^2}} + A_4 Y^4 + A_6 Y^6 + A_8 Y^8 + A_{10} Y^{10} + \ldots$$

The second or later terms define the amount of the aspherical surface.

There is the following relation between the ratio $A_4$ of the second term and the aspherical surface ratio $\phi$.

$$\phi = 8(N' - N) A_4$$

where N: the refractive index where the aspherical surface is not provided.

N': the refractive index where the aspherical surface is provided.

The aspherical surface ratio $\phi$ provides the following amount of variation against the third order aberration ratio.

$$\Delta I = h^4 \phi$$

$$\Delta II = h^3 \bar{h} \phi$$

$$\Delta III = h^2 \bar{h}^2 \phi$$

$$\Delta IV = h^2 \bar{h}^2 \phi$$

$$\Delta V = h \bar{h}^3 \phi$$

where
I: Aspherical aberration coefficient
II: Coma coefficient
III: Astigmatism coefficient
IV: Curved surface coefficient of spherical image absence surface
V: Distortion ratio
h: Height of paraxial an-axis rays passing through each lens surface
$\bar{h}$: Height of paraxial and off-axis rays passing through center of a pupil and each lens surface Although there are other equations for expressing the aspherical shape, when y is smaller than the curvature radius near the axis, it can be satisfactorily expressed with even order terms. Thus, even if the equations of the aspherical shape are changed, they are also applied to the present invention.

According to the present invention, three-lens group zoom lens system (applicable to a four-lens group zoom lens system) which is similar to the conventional system is used to provide a high zoom ratio lens system for a compact camera. To further increase a view angle, it is necessary to increase the ratio of a maximum value of height of paraxial on-axis rays in a first lens element 9 of a first lens group which is of the retro focus type and a height of paraxial rays in a first surface (condition (2), hereinafter referred to as a "retro-ratio").

If the upper limit of the condition (2),, aberrations could be well compensated for. However, a diameter of a front lens would be increased so that it would be difficult to made the overall lens system compact.

Inversely if the lower limit would be exceeded, a retro-ratio which is substantially the same level as that of the conventional system could be attained. Therefore, there would be no problem at a half-view angle of about 30°. However, to aim a much wide-angle ability, changes of various aberrations in accordance with the zooming operation would be remarkable. Particularly, it is difficult to compensate for the variations such as astigmatism, curvature of field, and distortion which are likely to occur as the view angle increased.

The condition (3) relates to a refractive power of the first lens group and particularly to the amount of zooming movement. As the power of the lens group 1 increases, the amount of zooming movement can be decreased. Thus, the lens system can be made compact. However, since the object of the present invention is to increase the view angle on the short focal length side, the focal length on the long focal length proportionally decreases. Thus, to attain the same level in the amount of zooming movement as that of the conventional system, it is possible to slightly decrease the in fractive power of the first lens group. When the upper limit of the condition (3) would be exceeded, although the amount of zooming movement can be well decreased, it is difficult to set the retro focus ratio in the range defined by the condition (2) and it is difficult to compensate for the aberrations. On the other hand, if the lower limit of the condition (3) is exceeded the compensation of the aberrations can be beneficially accomplished. However, the positive power of the first lens group would become too small, the amount of zooming movement would abruptly increase and the lens system could not be made compact.

The conditions (4) to (7) relate to the first lens group.

The condition (4) relates to the amount of movement of the first lens group and the third lens group. When the upper limit of the condition (4) would be exceeded, the amount of movement of the first lens group whose lens diameter is large increases and the lens system cannot be made compact. On the other hand, if the lower limit of the condition (4), would be exceeded, since the entire length from the first lens group to the first lens group becomes small, it would be difficult to compensate for aberrations on the long focal length side. In addition, the variations of various aberrations according to the zooming operation would be remarkable (they tend to vary in the minus direction and in the plus direction on the short focal length side and on the long focal length side, respectively). Thus, it is difficult to balance the aberrations in the entire zoom range.

The conditions (5), (6), and (7) are required to satisfy the condition (2). When each value exceeds the upper limit of each condition, there is a tendency to exceed the upper limit of the condition (2) and the diameter of the front lens increases. On the other hand, when each value exceeds the lower limit of each condition, there is a tendency to exceed the lower limit of the condition (2) and thereby the variations of various aberrations increase according to the amount of zooming movement.

The conditions (8) and (9) relate to the lens group IIa. To decrease the variations of aberrations according to the zooming operation, particularly, to decrease the variation of the spherical aberration, these conditions should be, satisfied. In the examples of the above-described systems (iii) and (iv), a cemented negative lens consisting of a biconcave negative lens and a positive lens (corresponding a fourth lens element and a fifth lens element of the present invention) is used in a one-group-two-element from. On the other hand, in accordance with the present invention, a sixth lens element 6 which is a negative meniscus lens whose concave surface faces the object is disposed behind the cemented negative lens to reduce the optical load imposed on the cemented negative lens.

The condition (8) relates to the distribution of the entire power of the lens group IIa comprising the sixth lens element. In the lens group IIa, the cemented negative lens and the sixth lens element 6 function a main lens component and an auxiliary lens component, respectively. When the value exceeds the upper limit of the condition (8), the power of the sixth lens element becomes much larger than that of the cemented negative lens. When the power of the cemented negative lens whose height of the off-axis rays is large in the lens group IIa becomes large, the aberrations can be effectively compensated for and the aberrations which occur in other focusing lens groups can be balanced therewith. On the other hand, when the value exceeds the lower limit of the condition (7), a negative power cannot be obtained.

The condition (7) defines the radius of curvature of the surface, facing the object, of the sixth lens element of the lens group IIa. In conjunctions with the condition (8), the sixth lens element is regarded as an auxiliary lens. However, when the lens group IIa is composed only of a cemented negative lens, an optical load imposed on the cemented lens is increased and the variations of various aberrations according to the zooming operation is increased. To properly compensate for the variations, the sixth lens element which is a negative meniscus lens is required. In addition, since the sixth lens element partially contributes to the divergence function, the surface facing the object should be concave. When the value exceeds the upper limit of the condition (9), the radius of curvature becomes large and the effect for compensating for the aberrations becomes small. Thus, the significance of adding the sixth lens element of the negative meniscus lens is lost. On the other hand, when the value exceeds the lower limit of the condition (9), the curvature radius becomes too small. Thus, the overcompensation takes place and high order spherical aberrations unpreferably tend to occur.

As described before, in order to reduce the variations of the spherical aberration and the coma, the compensation can easily be conducted by proving an aspherical surface in the second lens group II. In addition, it is possible to reduce the number of lens elements. In the lens group II, a good effect can be obtained by providing an aspherical surface in the lens group IIb which is close to the stop diaphragm and whose lens diameter is small also in this case, the aspherical lens can easily be produced.

When aiming at increasing the view angle, the diameters of the elements of the first lens group tend to increase. However, in the compact camera, when the view angle becomes large, the diameter of the lens should be decreased due to the barrier condition and the like. Although the interchangeable lenses for SLR cameras have not generally been provided with the barrier function, the spherical surface is advantageous to protect the user's eye and to make compact the camera body.

With respect to the focusing operation, a method similar to the arts system (iii) and (iv) can be used. In other words, the focusing operation only by the lens group 1 leads to a shortage of the amount of rays there-about. Instead, it is preferable to cause the focusing operation to be performed by the second lens group or the third lens group which had a large refractive power. By moving the second lens group and the third lens group in the reverse directions at the same time (if mechanically available), the amount of movement thereof can be reduced. In addition, it is also possible to slightly move the first lens group along with another group. However, there is no much benefit to move the large first lens group. If mechanically available, by disposing the stop diaphragm between the lens group IIa and the lens group IIb or in the lens group IIb, the front lens diameter can be beneficially reduced.

In the focusing method using the second lens group or the third lens group, the amount of movement depends on each focal length even at the same working distance to the object (namely, a so-called varifocal lens), when each focal length information can be obtained, the amount of movement of the lens can be electrically computed and detected. Thus, this method can be used substantially as a zoom lens.

Although the present invention can be applied to any type of the systems (i) to (iv), when it is applied to the system (iii) and (iv), regardless of the zooming and the focusing operations, the lens block and the shutter block can be separated. Thus, the zoom lens is preferably simplified in structure and in production. Examples Examples according to the present invention will be described. In the examples, $F_{NO}$ denotes F number; F, focal length; $\omega$, half-view angle; $f_B$, backfocus; r, curvature radius of each lens surface; d, lens thickness or lens interval; N, refractive index at d-line of each lens; $\nu$, Abbe number.

EXAMPLE 1

$F_{NO} = 1:4.0 \sim 6.3 \sim 8.2$   $f = 28.90 \sim 50.00 \sim 78.00$
$\omega = 37.2° \sim 23.0° \sim 15.2°$   $f_B = 8.55 \sim 26.71 \sim 47.56$

| Surface No. | r | d | | | N | $\nu$ |
|---|---|---|---|---|---|---|
| 1 | −67.000 | 1.50 | | | 1.83400 | 37.2 |
| 2 | 30.000 | 3.18 | | | | |
| 3 | 35.649 | 7.08 | | | 1.60311 | 60.7 |
| 4 | −34.403 | 0.10 | | | | |
| 5 | 44.447 | 2.95 | | | 1.51821 | 65.0 |
| 6 | −1296.396 | 3.50 | ∼9.90 | ∼16.44 | | |
| 7 | −24.807 | 1.20 | | | 1.83481 | 42.7 |
| 8 | 14.057 | 3.94 | | | 1.80518 | 25.4 |
| 9 | −56.765 | 0.62 | | | | |
| 10 | −26.615 | 1.50 | | | 1.80518 | 25.4 |
| 11 | −36.848 | 3.45 | | | | |
| 12 | 27.649 | 6.70 | | | 1.51633 | 64.1 |
| 13 | −9.804 | 1.35 | | | 1.80518 | 25.4 |
| 14 | −19.205 | 0.10 | | | | |
| 15 | −263.905 | 2.00 | | | 1.69680 | 55.5 |
| 16 | −29.282 | 11.42 | ∼5.63 | ∼2.30 | | |
| 17 | −30.741 | 3.90 | | | 1.80518 | 25.4 |
| 18 | −16.618 | 1.96 | | | | |
| 19 | −18.773 | 1.40 | | | 1.80610 | 40.9 |
| 20 | −38.837 | 3.20 | | | | |
| 21 | −12.254 | 1.40 | | | 1.83400 | 37.2 |
| 22 | −52.019 | | | | | |
| Conditions | (1) 1.233 | (2) 1.186 | (3) 1.098 | (4) 2.67 | | |
| | (5) 0.431 | (6) 0.110 | (7) 0.275 | (8) −1.086 | | |

EXAMPLE 2

$F_{NO} = 1:4.0 \sim 6.3 \sim 8.2$   $f = 28.90 \sim 50.00 \sim 78.01$
$\omega = 37.3° \sim 23.0° \sim 15.2°$   $f_B = 8.55 \sim 26.16 \sim 46.28$

| Surface No. | r | d | | | N | $\nu$ |
|---|---|---|---|---|---|---|
| 1 | −67.000 | 1.50 | | | 1.83400 | 37.2 |
| 2 | 30.000 | 3.51 | | | | |
| 3 | 36.202 | 7.08 | | | 1.58913 | 61.2 |
| 4 | −33.947 | 0.10 | | | | |
| 5 | 43.636 | 3.04 | | | 1.51633 | 64.1 |
| 6 | −556.668 | 3.50 | ∼9.89 | ∼16.38 | | |
| 7 | −24.946 | 1.20 | | | 1.83481 | 42.7 |
| 8 | 14.033 | 3.98 | | | 1.80518 | 25.4 |
| 9 | −52.172 | 0.60 | | | | |
| 10 | −26.069 | 1.50 | | | 1.80518 | 25.4 |
| 11 | −39.868 | 3.49 | | | | |
| 12 | 27.017 | 6.70 | | | 1.48749 | 70.2 |
| 13 | −9.836 | 1.35 | | | 1.80518 | 25.4 |
| 14 | −17.942 | 0.10 | | | | |
| 15 | 1486.734 | 2.00 | | | 1.69680 | 55.5 |
| 16 | −31.968 | 10.91 | ∼5.47 | ∼2.30 | | |
| 17 | −23.032 | 2.60 | | | 1.80518 | 25.4 |
| 18 | −16.225 | 2.66 | | | | |
| 19 | −19.823 | 1.40 | | | 1.83400 | 37.2 |
| 20 | −33.986 | 3.84 | | | | |
| 21 | −12.163 | 1.40 | | | 1.80400 | 46.6 |
| 22 | −52.931 | | | | | |
| Conditions | (1) 1.249 | (2) 1.234 | (3) 1.114 | (4) 2.56 | | |
| | (5) 0.431 | (6) 0.121 | (7) 0.343 | (8) −1.109 | | |

EXAMPLE 3

$F_{NO} = 1:4.0 \sim 6.3 \sim 8.2$   $f = 28.90 \sim 50.02 \sim 78.01$
$\omega = 37.2° \sim 22.8° \sim 15.1°$   $f_B = 8.55 \sim 26.18 \sim 48.11$

| Surface No. | r | d | | | N | $\nu$ |
|---|---|---|---|---|---|---|
| 1 | −67.000 | 1.50 | | | 1.83400 | 37.2 |
| 2 | 30.000 | 1.72 | | | | |
| 3 | 32.292 | 5.83 | | | 1.69680 | 55.5 |
| 4 | −46.739 | 0.10 | | | | |
| 5 | 91.788 | 2.60 | | | 1.69680 | 55.5 |
| 6 | −126.000 | 3.10 | ∼8.64 | ∼12.87 | | |
| 7 | −23.649 | 1.20 | | | 1.83481 | 42.7 |
| 8 | 10.441 | 4.02 | | | 1.80518 | 25.4 |
| 9 | 537.627 | 0.95 | | | | |
| 10 | −28.796 | 1.50 | | | 1.76182 | 26.5 |
| 11 | −35.614 | 1.54 | | | | |
| 12 | 15.559 | 6.21 | | | 1.48749 | 70.2 |
| 13 | −10.828 | 1.35 | | | 1.80518 | 25.4 |
| 14 | −43.306 | 0.56 | | | | |
| 15* | −500.000 | 2.30 | | | 1.73101 | 40.3 |
| 16 | −16.169 | 11.05 | ∼5.41 | ∼2.29 | | |
| 17 | −63.782 | 3.10 | | | 1.80518 | 25.4 |
| 18 | −22.615 | 1.73 | | | | |
| 19 | −37.515 | 1.30 | | | 1.83400 | 37.2 |
| 20 | 612.885 | 3.73 | | | | |
| 21 | −12.921 | 1.40 | | | 1.77250 | 49.6 |
| 22 | −113.145 | | | | | | aspherical 15th surface
$\alpha_4 = -0.68111756 \times 10^{-4}$
$\alpha_6 = -0.57017969 \times 10^{-7}$
$\alpha_8 = 0.13544071 \times 10^{-8}$

| Conditions | (1) −25.9 | (2) 1.139 | (3) 1.141 | (4) 1.026 |
|---|---|---|---|---|
| | (5) 2.77 | (6) 0.43 | (7) 0.060 | (8) 0.103 |
| | (9) −0.996 | | | |

EXAMPLE 4

$F_{NO} = 1:4.0 \sim 6.3 \sim 8.2$   $f = 28.90 \sim 50.00 \sim 78.01$
$\omega = 37.4° \sim 23.0° \sim 15.1°$   $f_B = 8.64 \sim 26.78 \sim 47.62$

| Surface No. | r | d | | | N | $\nu$ |
|---|---|---|---|---|---|---|
| 1 | −67.000 | 1.50 | | | 1.83400 | 37.2 |
| 2 | 31.700 | 3.52 | | | | |
| 3 | 36.881 | 5.83 | | | 1.58913 | 61.2 |
| 4 | −37.372 | 0.10 | | | | |
| 5 | 83.934 | 2.43 | | | 1.69680 | 55.5 |
| 6 | −231.881 | 3.50 | ∼9.96 | ∼17.42 | | |
| 7 | −23.862 | 1.20 | | | 1.83481 | 42.7 |
| 8 | 11.718 | 3.98 | | | 1.80518 | 25.4 |
| 9 | −353.010 | 3.48 | | | | |
| 10 | 16.764 | 6.70 | | | 1.48749 | 70.2 |
| 11 | −10.853 | 1.35 | | | 1.80518 | 25.4 |
| 12 | −49.651 | 0.60 | | | | |

-continued

| | | | | | |
|---|---|---|---|---|---|
| 13* | −249.998 | 2.30 | | 1.73101 | 40.3 |
| 14 | −16.130 | 11.05 | ~5.52 ~2.46 | | |
| 15 | −40.827 | 2.92 | | 1.80518 | 25.4 |
| 16 | −21.563 | 2.94 | | | |
| 17 | −29.948 | 1.30 | | 1.83400 | 37.2 |
| 18 | −133.219 | 3.53 | | | |
| 19 | −13.106 | 1.40 | | 1.77250 | 49.6 |
| 20 | −80.809 | | | | | aspherical 13th surface
$\alpha_4 = -0.54149571 \times 10^{-4}$
$\alpha_6 = -0.44937568 \times 10^{-7}$
$\alpha_8 = 0.11545667 \times 10^{-8}$
Conditions (1) −24.0 (2) 1.224 (3) 0.967 (4) 1.137
(5) 3.15 (6) 0.43 (7) 0.122 (8) —
(9) —

EXAMPLE 5

| $F_{NO} = 1:4.0 \sim 6.3 \sim 8.2$ | | | $f = 28.93 \sim 50.01 \sim 78.01$ | | |
|---|---|---|---|---|---|
| $\omega = 37.1° \sim 22.8° \sim 15.1°$ | | | $f_B = 8.65 \sim 26.34 \sim 47.46$ | | |
| Surface No. | r | d | | N | ν |
| 1 | −67.000 | 1.50 | | 1.83400 | 37.2 |
| 2 | 30.838 | 3.07 | | | |
| 3 | 36.307 | 5.55 | | 1.69680 | 55.5 |
| 4 | −42.624 | 0.10 | | | |
| 5 | 113.155 | 2.17 | | 1.69680 | 55.5 |
| 6 | −350.252 | 3.10 | ~10.56 ~17.74 | | |
| 7 | −20.717 | 1.20 | | 1.83481 | 42.7 |
| 8 | 14.347 | 3.53 | | 1.80518 | 25.4 |
| 9 | −150.908 | 2.22 | | | |
| 10 | 16.212 | 6.70 | | 1.48749 | 70.2 |
| 11 | −11.340 | 1.35 | | 1.80518 | 25.4 |
| 12 | −44.813 | 0.39 | | | |
| 13* | −333.341 | 2.30 | | 1.73077 | 40.5 |
| 14 | −16.566 | 10.93 | ~5.47 ~2.47 | | |
| 15 | −69.168 | 3.40 | | 1.80518 | 25.4 |
| 16 | −22.389 | 1.90 | | | |
| 17 | −29.098 | 1.30 | | 1.83400 | 37.2 |
| 18 | −428.437 | 3.53 | | | |
| 19 | −13.204 | 1.40 | | 1.79952 | 42.2 |
| 20 | −90.458 | | | | | aspherical 13th surface
$\alpha_4 = -0.61321151 \times 10^{-4}$
$\alpha_6 = -0.80587532 \times 10^{-7}$
$\alpha_8 = 0.11442522 \times 10^{-8}$
Conditions (1) −24.3 (2) 1.191 (3) 0.867 (4) 1.159
(5) 3.58 (6) 0.43 (7) 0.106 (8) —
(9) —

As described above, according to the present invention, by satisfying the above conditions, a high performance zoom lens for a compact camera with a high zoom ratio, a small size, and a wide angle ability can be accomplished.

I claim:

1. In a high zoom-ratio lens system covering wide angle for compact camera comprising a first lens group having a positive focal length, a second lens group having a positive focal length, and a third lens group having a negative focal length, disposed in order from the object side,
   when zoomed from a short focal length side to a long focal length side, all of the first lens group, the second lens group, and the third lens group being moved toward the object so that a distance between the first lens group and the second lens group increases and the distance between the second lens group and the third lens group decreases, the improvement wherein:
   (A) said second lens group further comprises, in the order from the object side, a lens group IIa having a negative focal length and a lens group IIb having a positive focal length;
   (B) when zoomed from the short focal length side to the long focal length, a stop diaphragm is moved along with the second lens group;
   (C) the following conditions (2) and (3) are satisfied:

$$1.09 < h_{IMAX}/h_{I-1} < 1.4 \quad (2)$$

$$0.5 < f_T/f_I < 1.5 \quad (2)$$

where
$h_{IMAX}$: the maximum value of the height of the paraxial rays in the first lens group;
$h_{I-1}$: the height of the paraxial on-axis rays on a first surface of a first lens group;
$f_T$: the focal length of the entire system at the long focal length;
$f_I$: the focal length of the first lens group.

2. The lens system according to claim 1, wherein the first lens group comprises a first lens element which is a biconcave negative lens, a second lens element which is a biconvex positive lens, and a third lens element which is a positive lens whose convex side surface faces the object, the following conditions being satisfied:

$$0.95 < X_I/X_m < 1.3 \quad (4)$$

$$2.0 < f_I/|f_1| < 5.0 \quad (5)$$

$$0 < f_W/|r_1| < 0.7 \quad (6)$$

$$0 < d_2/f_W < 0.25 \quad (7)$$

where
$X_I$: the amount of zooming movement of the first lens group;
$V_{III}$: the amount of zooming movement of the third lens group;
$f_1$: the focal length of the first lens element;
$f_W$: the focal length of the entire system at the short focal length;
$r_1$: the curvature radius of the surface, facing the object, of the first lens element ($r_1 < 0$);
$d_2$: the distance between the first lens element and the second lens element.

3. The lens system according to claim 1, wherein the lens group IIa comprises a negative cemented lens consisting of a fourth lens element which is a biconcave negative lens having a cemented interface with a large convex curvature facing the object and a fifth lens element which is a positive lens, and a sixth lens element which is a negative meniscus lens whose concave surface faces the object, the following conditions being satisfied:

$$0.0 < f_{IIa}/f_6 < 0.5 \quad (8)$$

$$-1.5 < F_W/r_{10} < -0.5 \quad (9)$$

where
$f_{IIa}$: the focal length of the lens group IIa;
$f_6$: the focal length of the sixth lens element;
$r_{10}$: the curvature radius of the sixth lens element facing the object.

4. The lens system according to claim 1, wherein the lens group IIb comprises a positive cemented lens consisting of a seventh lens element which is a positive lens with a large curvature concave cemented interface facing the object and an eighth lens element which is a negative meniscus lens, and a ninth lens element which is a positive lens, disposed in order from the object side.

5. The lens system according to claim 1, wherein the third lens group comprises a tenth lens element which is a positive lens having a large convex curvature surface facing the image and eleventh and twelfth lens elements and which are negative lenses each of which has a large concave curvature surface facing the object, disposed in order from the object side.

6. The lens system according to claim 1, wherein the stop diaphragm is disposed behind the second lens group and between the second lens group and the third lens group, the stop diaphragm being moved together with the second lens group.

7. The lens system according to claim 1, wherein when zoomed from the short focal length to the long focal length, the first lens group, the stop diaphragm, and the third lens group are fixed and only second lens group is moved toward the object.

8. The lens system according to claim 1, wherein when zoomed from the short focal length to the long focal length, the first lens group, the second lens group, and the stop diaphragm are fixed and only the third lens group is moved to the image side.

9. In a high zoom-ratio lens system covering wide angle for compact camera comprising a first lens group having a positive focal length, a second lens group having a positive focal length, and a third lens group having a negative focal length, disposed in order from the object side, when zoomed from a short focal length side to a long focal length side, all of the first lens group, the second lens group, and a third lens group being moved toward the object side so that the distance between the first group and the second group increases and a distance between the second lens group and the third lens group decreases, the improvement wherein:

(A) the second lens group further comprises, disposed in the order from the object side, a lens group IIa having a negative focal length and a lens group IIb having a positive focal length;

(B) when zoomed from the short focal length side to the long focal length, a stop diaphragm is moved together with the second lens group;

(C) said lens group IIb has an aspherical surface with divergence against a paraxial curvature radius which satisfies the following equation (1):

$$-50 < \Delta I_{2b} < -5 \tag{1}$$

where $\Delta I_{2b}$ is the amount of variation of the third order spherical surface aberration coefficient on the aspherical surface of the lens group IIb (the aberration coefficient when the focal length of the entire system at the short focal length is regarded as 1).

10. The high zoom-ratio lens according to claim 9, wherein the first lens group comprises a first lens element which is a biconcave negative lens, a second lens element which is a biconvex positive lens, and a third lens element which is a positive lens whose convex surface faces the object, the following conditions being satisfied:

$$1.09 < h_{IMAX}/h_{I-1} < 1.4 \tag{2}$$

$$0.5 < f_T/f_I < 1.5 \tag{3}$$

$$0.95 < X_I/X_m < 1.3 \tag{4}$$

$$2.0 < f_I/|f_1| < 5.0 \tag{5}$$

$$0 < f_W/|r_1| < 0.7, \ r_1 < 0 \tag{6}$$

$$0 < d_2/f_W < 0.25 \tag{7}$$

where $H_{IMAX}$: the maximum value of the height of the paraxial rays in the first lens group;

$h_{I-1}$: the height of the paraxial rays on the first surface of the first lens group;

$f_T$: the focal length of the overall system at the long focal length;

$f_I$: the focal length of the first lens group.

$X_I$: the amount of zooming movement of the first lens group;

$X_{III}$: the amount of zooming movement of the third lens group;

$f_1$: the focal length of the first lens element;

$f_W$: the focal length of the entire system at the short focal length;

$r_1$: the curvature radius of the surface of the first lens element facing the object;

$d_2$: the distance between the first lens element and the second lens element.

11. The lens system according to claim 9, wherein the lens group IIa comprises a negative cemented lens consisting of a biconcave negative lens having a cemented interface with a large convex curvature facing the image and a positive lens, and negative meniscus lens whose concave surface faces the object, the following conditions being satisfied, $$0.0 < f_{IIa}/f_6 < 0.5 \tag{8}$$

$$-1.5 < f_W/r_{10} < -0.5 \tag{9}$$

where $f_{IIA}$: the focal length of the lens group IIa;

$f_6$: the focal length of the negative meniscus lens of the lens group IIa;

$r_{10}$: the curvature radius of the surface of the negative meniscus lens of the lens group IIa facing the object.

12. The lens system according to claim 9, wherein the lens group IIa comprises a cemented negative lens consisting of a biconcave negative lens having a cemented interface with a large convex curvature facing the image and a positive lens, disposed in order from the object side.

13. The lens system according to claim 9, wherein the lens group IIa comprises a cemented negative lens consisting of a positive lens with a large curvature concave cemented surface facing the object and a negative meniscus lens and a positive lens, disposed in the order from object side.

14. The lens system according to claim 9, wherein the third lens group comprises a positive lens having a large convex curvature surface facing the image and two negative lenses each of which has a large concave curvature surface facing the object, disposed in the order from the object side.

15. The lens system according to claim 9, wherein the stop diaphragm is disposed in the second lens group or between the second lens group and the third lens group, the stop diaphragm being moved together with the second lens group, when focused.

16. The lens system according to claim 9, wherein the stop diaphragm is disposed between the second lens group and the third lens group, the first lens group, the stop diaphragm, and the third lens group being fixed, only the second lens group being moved toward the object, when focused.

17. The lens system according to claim 9, wherein the stop diaphragm is disposed between the second lens group and the third lens group, the first lens group, the second lens group, and the stop diaphragm being fixed, only the third lens group being moved toward the object, when focused.

* * * * *